(12) United States Patent
Koplin et al.

(10) Patent No.: US 8,397,612 B2
(45) Date of Patent: Mar. 19, 2013

(54) MODULAR ROLLER SYSTEM

(75) Inventors: Joshua Koplin, Philadelphia, PA (US);
Samuel Reeves, Philadelphia, PA (US);
Stephen Ahnert, Philadelphia, PA (US);
Erik de Brun, Philadelphia, PA (US);
Scott Poff, Philadelphia, PA (US);
Daniele Salvatore Tedesco, Dresher, PA (US)

(73) Assignee: Humanistic Robotics, Inc., Philadelphia, PA (US)

( * ) Notice: Subject to any disclaimer, the term of this patent is extended or adjusted under 35 U.S.C. 154(b) by 86 days.

(21) Appl. No.: 12/694,924

(22) Filed: Jan. 27, 2010

(65) Prior Publication Data

US 2011/0180283 A1    Jul. 28, 2011

(51) Int. Cl.
*F41H 11/12*    (2011.01)

(52) U.S. Cl. ............ 89/1.13; 102/402; 172/611

(58) Field of Classification Search ........... 172/112, 172/122, 177, 508, 509, 518, 535, 540, 547, 172/558, 776, 537, 637, 634; 89/1.13; 404/123, 404/130; 102/402, 403
See application file for complete search history.

(56) References Cited

U.S. PATENT DOCUMENTS

| | | | | |
|---|---|---|---|---|
| 695,713 A * | 3/1902 | Fetzer | ............ | 172/558 |
| 732,623 A * | 6/1903 | Elison | ............ | 172/507 |
| 828,575 A * | 8/1906 | Schilling | ............ | 172/545 |
| 1,074,763 A * | 10/1913 | Wills | ............ | 172/507 |
| 1,078,338 A * | 11/1913 | Downie | ............ | 172/117 |
| 1,190,257 A | 7/1916 | Henderson | | |
| 1,512,502 A * | 10/1924 | Schilling | ............ | 172/350 |
| 1,579,297 A * | 4/1926 | Franklin | ............ | 172/518 |
| 2,015,891 A * | 10/1935 | Greiner et al. | ............ | 404/123 |
| 2,141,421 A * | 12/1938 | Taylor | ............ | 305/51 |
| 2,200,230 A | 5/1940 | Hojnowski | | |
| 2,261,933 A | 11/1941 | Flynn | | |
| 2,745,330 A | 5/1956 | Nelson | | |
| 3,101,793 A * | 8/1963 | Brown et al. | ............ | 172/609 |
| 3,199,608 A | 8/1965 | Robbins | | |
| 3,716,005 A | 2/1973 | Fennell | | |
| 3,771,413 A | 11/1973 | Sieg et al. | | |
| 4,065,094 A | 12/1977 | Adams | | |
| 4,425,972 A * | 1/1984 | Steinberg | ............ | 172/551 |
| 4,828,042 A * | 5/1989 | Arnold | ............ | 172/572 |
| 4,840,105 A | 6/1989 | Landan et al. | | |

(Continued)

FOREIGN PATENT DOCUMENTS

| | | |
|---|---|---|
| DE | 2048921 | 4/1972 |
| DE | 2622162 | 12/1977 |

(Continued)

*Primary Examiner* — Jamie L McGowan
(74) *Attorney, Agent, or Firm* — Tieff I.P. Law, P.C.; Michael Tieff (57) ABSTRACT

In an implementation, a roller system is provided. The roller system includes a modular frame. The frame includes a plurality of weight component attachment points. Each weight component attachment point is adapted to receive one or more weight components such that a weight of the frame and location of a center of gravity of the frame is adjusted by the addition of one or more weight components to each of the plurality of weight component attachment points. The frame further includes at least one arm assembly adapted to connect to the frame, and to apply force to a surface, wherein the force applied to the surface is proportional to the weight of the frame and the location of the center of gravity of the frame.

15 Claims, 6 Drawing Sheets

U.S. PATENT DOCUMENTS

| | | | |
|---|---|---|---|
| 4,909,128 A | 3/1990 | Grinwald | |
| 4,972,664 A | 11/1990 | Frey | |
| 5,007,325 A | 4/1991 | MacWatt | |
| 5,313,868 A | 5/1994 | Wolf | |
| 5,431,082 A | 7/1995 | Zelverte et al. | |
| 5,474,135 A * | 12/1995 | Schlagel | 172/151 |
| 5,706,899 A | 1/1998 | Klebanov et al. | |
| 5,786,542 A | 7/1998 | Petrovich et al. | |
| 5,856,629 A * | 1/1999 | Grosch et al. | 89/1.13 |
| 5,892,360 A | 4/1999 | Willer et al. | |
| 5,936,185 A | 8/1999 | Tokuni | |
| 5,979,289 A | 11/1999 | French | |
| 5,979,290 A | 11/1999 | Simeone | |
| 5,988,037 A | 11/1999 | Haughorn et al. | |
| 6,068,061 A * | 5/2000 | Smith et al. | 172/139 |
| 6,182,769 B1 | 2/2001 | Karlen | |
| 6,371,001 B1 | 4/2002 | Schmid | |
| 6,481,326 B2 | 11/2002 | French | |
| 6,761,120 B2 * | 7/2004 | Kovach et al. | 111/140 |
| 6,802,237 B1 * | 10/2004 | Jones et al. | 89/1.13 |
| 6,871,709 B2 * | 3/2005 | Knobloch et al. | 172/145 |
| 6,915,728 B2 | 7/2005 | Renwick et al. | |
| 6,952,990 B1 | 10/2005 | Clodfelter | |
| 7,013,982 B2 | 3/2006 | Northcutt | |
| 7,100,489 B1 | 9/2006 | Kendall | |
| 7,104,206 B2 * | 9/2006 | Jones | 111/164 |
| 7,168,501 B2 | 1/2007 | Willibald | |
| 7,198,112 B2 | 4/2007 | Wanner | |
| 7,401,657 B2 * | 7/2008 | Huber | 172/395 |
| 7,806,197 B2 * | 10/2010 | Steinlage et al. | 172/176 |
| 2003/0196543 A1 | 10/2003 | Moser et al. | |
| 2006/0266576 A1 | 11/2006 | Eckoff | |
| 2008/0236376 A1 | 10/2008 | Reeves et al. | |

FOREIGN PATENT DOCUMENTS

| | | |
|---|---|---|
| DE | 2632568 | 1/1978 |
| DE | 10259436 | 7/2004 |
| EP | 1688699 | 8/2006 |
| FR | 909874 | 5/1946 |
| FR | 917695 | 1/1947 |
| FR | 997365 | 1/1952 |
| FR | 1157301 | 5/1958 |
| FR | 1240528 | 9/1960 |
| FR | 2618540 | 1/1989 |
| GB | 1337183 | 11/1973 |
| GB | 2294910 | 5/1996 |
| JP | 11211397 | 8/1999 |
| JP | 11257894 | 9/1999 |
| JP | 2000046496 | 2/2000 |
| JP | 20000337796 | 12/2000 |
| JP | 2002090095 | 3/2002 |
| JP | 2003042698 | 2/2003 |
| JP | 2004177106 | 6/2004 |
| JP | 2004353945 | 12/2004 |
| JP | 2006064205 | 3/2006 |
| JP | 2006300397 | 11/2006 |
| WO | 9311402 | 6/1993 |
| WO | 9637752 | 11/1996 |
| WO | 9738281 | 10/1997 |
| WO | 9814748 | 4/1998 |
| WO | 9814749 | 4/1998 |
| WO | 0043725 | 7/2000 |
| WO | 0161270 | 8/2001 |
| WO | 03086842 | 10/2003 |
| WO | 2004072574 | 8/2004 |
| WO | 2004106839 | 12/2004 |
| WO | 2007027217 | 5/2007 |
| WO | 2009038762 | 3/2009 |

* cited by examiner

MODULAR ROLLER SYSTEM

CROSS REFERENCE TO RELATED APPLICATIONS

The present application is related to U.S. patent application Ser. No. 11/912,106. The contents of which are hereby incorporated by reference in its entirety.

BACKGROUND

At present, land mines are found in over sixty-five countries in a variety of environmental conditions. A number of different technologies have been employed in demining applications. These include, but are not limited to, rollers, flails, plows, and tillers. Each of these technologies has different performance characteristics, and in most demining applications, combinations of these technologies are used to ensure that the highest possible percentage of mines are detonated. In many situations, rollers are used as a first-pass treatment both to clear mines and also to prepare the soil for subsequent treatments. Compared to other systems, roller-type devices are mechanically simple, easy to maintain, and require less power to operate. Another major advantage is that rollers leave the host environment more intact in comparison to other systems that tend to remove or significantly disturb the soil. However, traditional roller-type devices face a number of drawbacks.

One such drawback is the weight associated with the roller device. For a roller to be effective, it must produce enough force on the ground to detonate mines in the ground below. Solutions to this problem include making the rollers from heavier materials. This solution can be problematic because often the roller must be transported large distances making the extra weight associated with the roller costly in terms of both transportation costs and both transport and manufacturing costs are higher when material is increased. Also, if the roller becomes damaged or overturned due to a mine detonation, the additional weight of the roller may make retrieving or reorienting the roller difficult and/or dangerous. Moreover, different environments, soil types, and mine types may require more or less weight for successful detonation.

Another solution to the weight problem described above is the use of vehicles to provide additional weight to the roller. Typically rollers are pushed by a vehicle such as a tank or a tractor. In some operating scenarios, the weight of the vehicle may be applied to the roller through a suspension that raises part of the vehicle onto the roller, such that some of the weight of the vehicle is directed downward through the roller into the ground. This methodology effectively increases the amount of force applied by the roller to the ground. However, such a solution requires the vehicle to be closer to the roller than may be prudent, putting the vehicle (and driver) at risk with respect to a detonation. In addition, a hitch between the vehicle and the roller sufficient to transfer the force of the vehicle to the roller may also result in a damage to the vehicle should the roller flip or be overturned due to a detonation. A final drawback of this method is that the traction between the vehicle and the ground reduces dramatically when the vehicle is raised up, and that loss of traction may result in reduced maneuverability.

Another drawback associated with roller devices is the bow wave effect. A bow wave is gradual buildup of debris such as dirt or other materials in front of the wheels of the roller device. Such buildup may result in increasing the force needed to advance the roller by the pushing vehicle, this can cause the roller wheels to stop turning, which may result in fewer successful mine detonations as the buildup of debris may shield or protect the mine from otherwise receiving the full force of the roller.

Still another drawback associated with roller devices in the accumulation of debris such as mud or other materials in and around the wheels of the roller. Such buildup may make one or more wheels inoperable, requiring the roller to be stopped so that the debris may be cleared. Such clearing must be performed manually putting the clearer at risk to a detonation or fire during a combat situation. The mud clearance process is also time consuming, and if it's not done, the mine-clearing performance of the system may degrade.

SUMMARY

In an implementation, a modular roller system is provided. The modular roller system includes a frame. The frame includes a plurality of weight component attachment points. Each weight component attachment point is adapted to receive one or more weight components such that a weight of the frame and location of a center of gravity of the frame is adjusted by the addition of one or more weight components to one or more of the plurality of weight component attachment points. The frame further includes at least one arm assembly adapted to connect to the frame, and to apply force to a surface, wherein the force applied to the surface is proportional to the weight of the frame and the location of the center of gravity of the frame.

Implementations may include some or all of the following features. At least one arm assembly may be adapted to detachably connect to the frame. The at least one arm assemble may include an arm mount for detachably connecting to the frame. The arm mount may be a collar clamp. The arm mount may be detachably connected to the frame using at most four bolts. The at least one arm assembly may include a wheel, a fork, a hub assembly, and a debris removal component adapted to remove debris between the wheel and the hub assembly as the wheel is rotated. The wheel may further include a plurality of paddle components connected to the hub assembly. The paddle components may be spaced on the hub assembly to prevent the formation of a bow wave. The debris removal component may be mounted to the fork and may extend from the fork into a space formed between the wheel and the hub assembly. The debris removal component may be a bolt. The debris removal component may be a plurality of bolts.

The debris removal component may include a mounting plate adapted to mount to the fork, a first side portion connected to the mounting plate and extending into the space between the hub assembly and the wheel, a second side portion connected to the mounting plate and extending into the space between the hub assembly and the wheel, a first end portion connected to the first side portion and covering a portion of the hub assembly, and a second end portion connected to the first side portion and covering a portion of the hub assembly.

In an implementation, an arm assembly is provided. The arm assembly may include a wheel, a fork, a hub assembly, and a debris removal component. The debris removal component may be adapted to remove debris between the wheel and the hub assembly as the wheel is rotated.

Implementations may include some or all of the following features. The wheel may further include a plurality of paddle components connected to the hub assembly. The paddle components may be spaced on the hub assembly to prevent the formation of a bow wave. The debris removal component may be mounted to the fork and may extend from the fork into a space formed between the wheel and the hub assembly. The debris removal component may include a mounting plate adapted to mount to the fork, a first side portion corrected to the mounting plate and extending into the space between the hub assembly and the wheel, a second side portion corrected to the mounting plate and extending into the space between the hub assembly and the wheel, a first end portion connected to the first side portion and covering a portion of the hub assembly, and a second end portion connected to the first side portion and covering a portion of the hub assembly. The debris removal component may include a plurality of bolts.

In an implementation, a debris removal system is provided. The debris removal system may include a mounting plate adapted to mount to a fork, a first side portion connected to the mounting plate and extending into a space between a hub assembly and a wheel, a second side portion connected to the mounting plate and extending into the space between the hub assembly and the wheel, a first end portion connected to the first side portion and covering a portion of the hub assembly, and a second end portion connected to the first side portion and covering a portion of the hub assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there is shown in the drawings example constructions; however, the implementations are not limited to the specific structures and instrumentalities disclosed. In the drawings.

Figure 1:
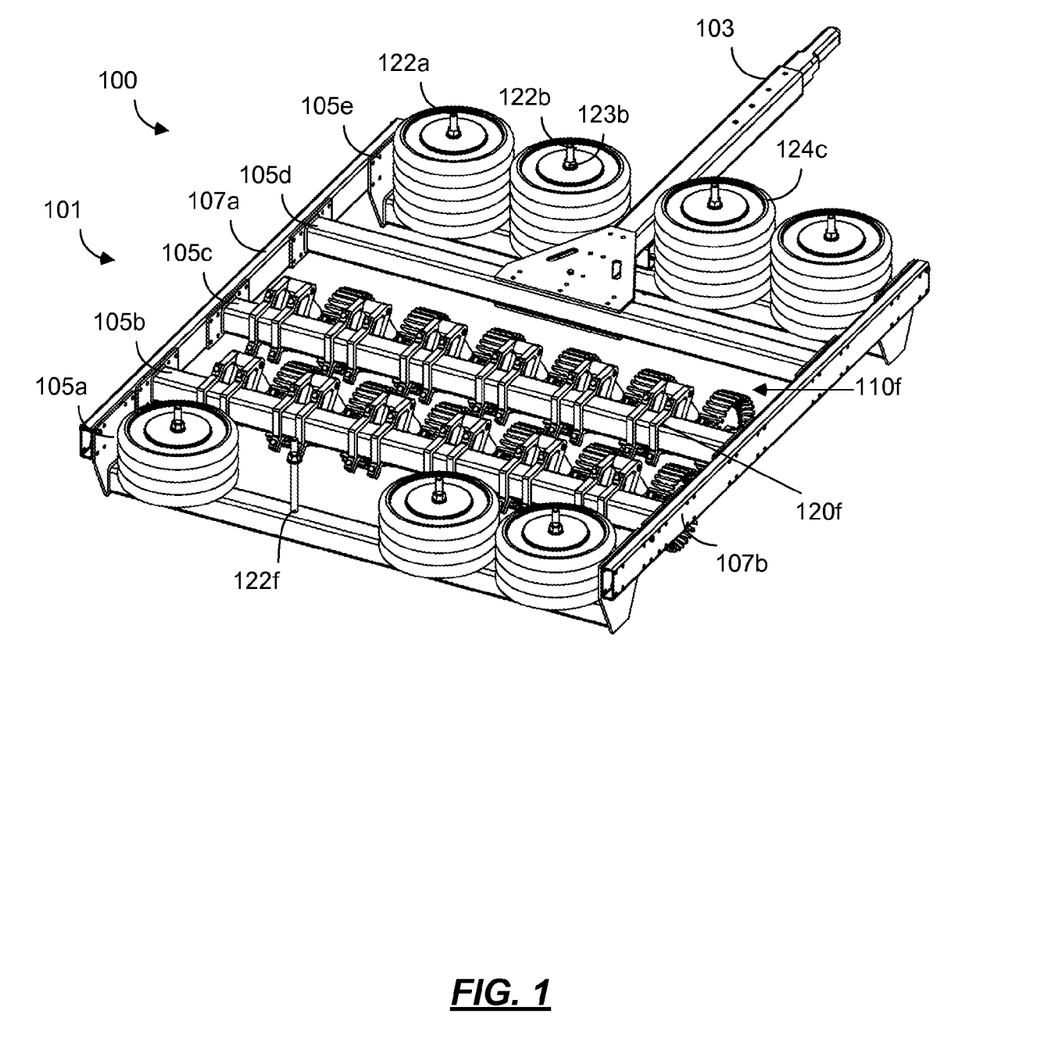
FIG. 1 is an illustration of a perspective view of an example roller system.
Figure 2:
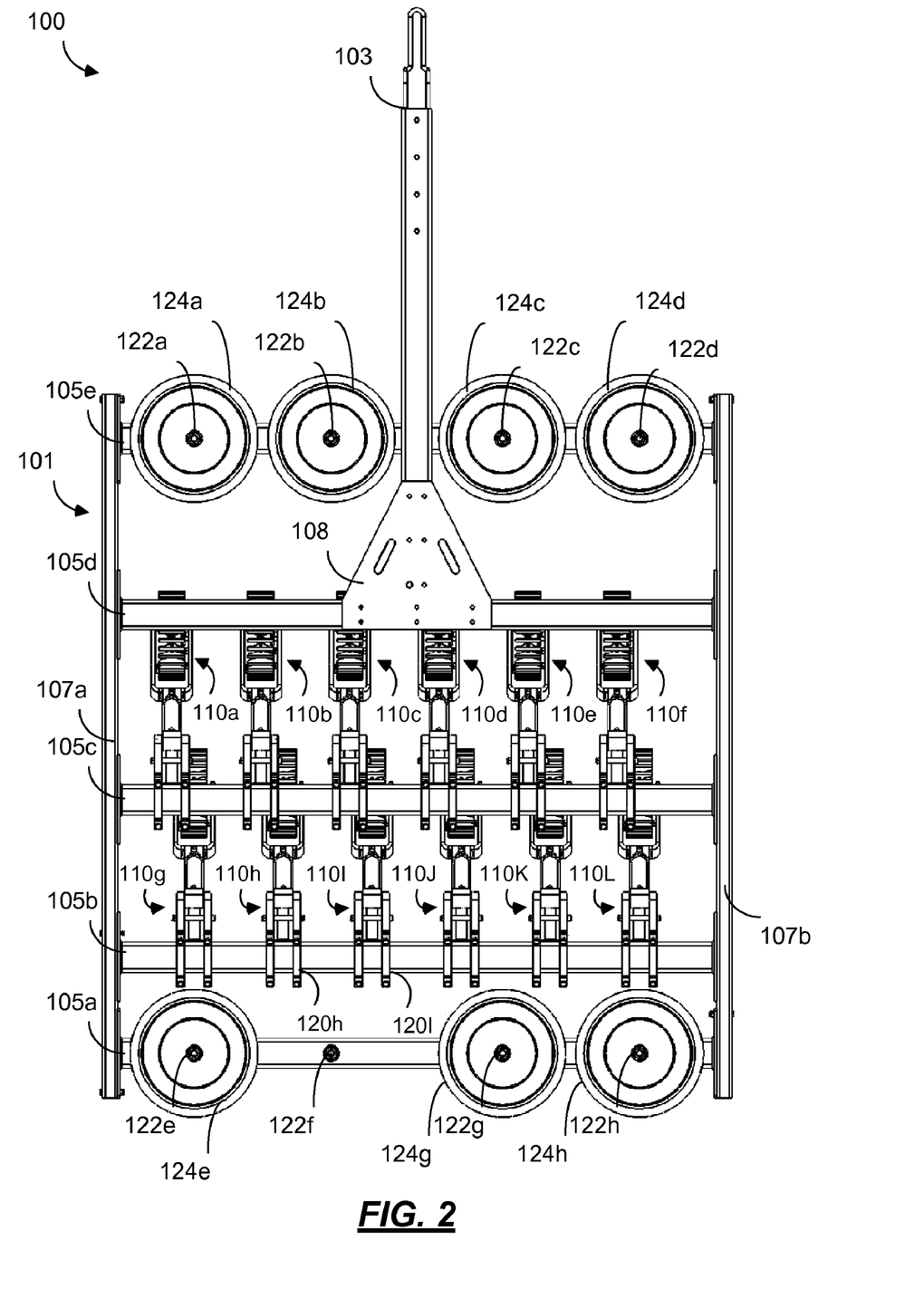
FIG. 2 is an illustrations of a top view of an example roller system.

FIGS. 1 and 2 are illustrations of an example roller system 100. FIG. 1 represents a perspective view of the roller system 100 and FIG. 2 represents a top view of the roller system 100. As illustrated, the roller system 100 includes a frame 101. The system 100 may further include one or more arm assemblies 110 connected to the frame 101 (e.g., arm assemblies 110a-L). The arm assemblies 110 are adapted to make contact with the ground or other surface through a wheel 114 to apply a force. In some implementations, the roller system 100 may be used to detonate land mines buried in the ground as the roller system 100 is pushed and/or towed by a vehicle or other device.

The frame 101 may be constructed from a variety of materials and/or material types. Example material types may include various metals or metal alloys such as aluminum or steel, and carbon fiber. In some implementations, a material may be selected that provides sufficient durability without providing unnecessary weight to the frame 101.

The frame 101 may include side members 107a and 107b connected to one or more transverse members 105 (e.g., transverse members 105a-105e). The side members 107a and 107b may be positioned substantially parallel with respect to one another. The transverse members may be positioned substantially parallel to one another and perpendicular to side members 107a and 107b. In some implementations, each of transverse members 105a-105e may be of substantially the same length, while in other implementations, the lengths of the transverse members 105a-105b may vary. For example, in some implementations, the side members 107a and 107b may intersect and the lengths of the transverse members 105a-105e may be varied.

In some implementations, the lengths of the side members 107a and 107b and/or transverse member 105a-105e may be fixed. In other implementations, the lengths may be variable. For example, the side members 107a-107b and/or transverse members 105a-105e may have telescoping portions that allow their lengths to be varied from a minimum length to a maximum length. Thus, a technician or operator of the roller system 100 may vary the overall size of the frame 101 by adjusting the lengths of the side members 107a-107b and/or transverse members 105a-105e to account for environmental conditions. For example, the frame 101 may be made smaller to fit through a path or widened to cover more ground in a field or other open space.

In some implementations, the side members 107a-107b and/or transverse members 105a-e may be detachably connected to one another such that the side members 107a-107b and/or transverse members 105a-105e may be detached from one another. Any method or system for detachably connecting may be used such as bolts, screws, or other fasteners. The fasteners are desirably selected such that the frame 101 may be easily disassembled and reassembled for transport or shipment. In other implementations, the side members 107a-107b and/or the transverse members 105a-105e may be permanently attached using permanent attachment means such as welding, for example.

In some implementations, the fasteners may be selected such that they release or disengage when they receive a force or load that is greater than some predetermined force or load. By disengaging, the fasteners may protect the side members 107a-b and/or transverse members 105a-105e from bending or becoming damaged in the event of a detonation. Any type of disengaging fastener may be used. For example, the fasteners may be constructed from plastic or some other material that is less strong than the material used for the side members 107a-107b and/or the transverse members 105a-105e.

The frame 101 may further include a hitch portion 103. The hitch portion 103 may be constructed from metal or other material and may be adapted to be attached to a vehicle or other pushing means such that the roller system 100 may be moved. As illustrated, the hitch portion 103 may be connected to the frame through a connector 108 attached to the transverse member 105d. However, the connector 108 and/or the hitch portion 103 may be connected to any of the transverse members 105a-105d, for example. The hitch portion 103 and/or connector 108 may be constructed from the same or different materials used for the side members 107-107b and/or transverse members 105a-105e. In implementations where the side members 107a-107b are connected or meet, the connector 108 and/or the hitch portion 103 may be alternatively connected to the side members 107a-107b.

Similarly to the side members 107a-107b and/or the transverse members 105a-105e, the hitch 103 and/or the connector 108 may be permanently attached to the frame 101 or detachably connected to the frame 101. By detachably connecting the various members and components of the frame 101, the frame 101 may be easily assembled and disassembled for shipment and transport to a demining operation.

As illustrated, the roller 101 may further include a plurality of arm assemblies (e.g., arm assemblies 110a-110l). Each of the arm assemblies may be connected to one of transverse members 105a-105d through what is referred to herein as an arm mount (e.g., arm mounts 120). Each of the arm assemblies 110a-110L may be adapted to apply a pressure or force to the ground beneath the roller system 101. The arms assemblies 110a-110L may be adapted to apply a sufficient force to detonate a mine or other pressure triggered explosive device located underneath the ground. In some implementations, the pressure or force applied by an arm assembly is proportional to the weight of the frame 101 and the location of the center of gravity of the frame 101. Moreover, the pressure or force applied by an arm assembly may be proportional to the number of arm assemblies connected to the frame 101.

As illustrated, each arm assembly 110a-110L is adapted to connect to one of the transverse members through an arm mount. For example, arm assembly 110f is connected to transverse member 105c through arm mount 120f. As illustrated, transverse member 105c is connected to six arm assemblies (e.g., arm assemblies 110a-110f) and transverse member 105b is connected to six arm assemblies (e.g., arm assemblies 110g-110l). However, implementations may have more or fewer arm assemblies connected to each transverse member. The number of arm assemblies connected to each transverse member may be determined by the size of the particular arm assembly and/or the size of the transverse member. There is no limit to the number of arm assemblies that may be supported. Moreover, more or fewer transverse members may be adapted to connect to arm assemblies. For example, while only two transverse members are illustrated as connecting to arm assemblies, implementations may include 3, 4, or 5 transverse members connecting to one or more arm assemblies. Any number of transverse members/arm assemblies may be supported. The particular features of the arm assembly 120 will be described further with respect to FIG. 3.

The frame 101 may further include one or more weight component attachments points (e.g., weight component attachment points 122a-122h). The weight attachments points 122a-122h may be adapted to receive one or more weight components (e.g., weight components 124a-124e, 124g, and 124h). As illustrated the weight component attachments points 122a-122h are arranged on transverse members 105a and 105e. However, any of the transverse members 105a-105e may include weight component attachment points. Moreover, in some implementations, the weight component attachment points may be arranged on the side members 107a-107b. The weight attachments component points may be arranged vertically as illustrated, or may be alternatively arranged in a horizontal position on the side members 107a-107b, for example.

For illustrative purposes, weight attachment point 122f is shown without a corresponding weight component. Weight attachment point 122f may be a metal rod that is capable of securing a weight component 124 that it passes through. The length of the weight attachment point 122f may be varied according to the number of weight components that it is likely to secure. Other sizes may also be used.

The weight components 124 may be made from any suitably heavy material such as steel or iron and may be of a variety of weights and sizes. In some implementations, the weight components 124 may be filled with sand, water, or some other material. By filling the weight components with a material, the weight components 124 may be easily shipped or transported to a mine clearance operation empty and then filled with materials as needed.

In some implementations, each weight component attachment point 122 may include a bin or other container adapted to receive various materials. For example, each weight component attachment point 122 may be adapted to receive and secure rocks, concrete blocks, sand, or other material that is available at a demining operation site. By allowing the use of local materials with the weight component attachment points, the operators of the roller 100 may increase the weight of the roller 100 without having to transport one or more weight components.

The weight component attachment points 122a-122h may be arranged on the frame 101 such that the overall weight of the frame (and corresponding force applied to the ground by the arm assemblies 110a-110l) in increased. As described above in the background section, one drawback associated with roller systems is the amount of weight that must be built into a roller system to ensure adequate detonation force. This weight may require more expensive materials and may result in more expensive shipping costs, as well as difficulties in assembling the roller due to the weight of its components. The roller system 100 solves this problem by including one or more of the weight component attachment points 122a-122h that allow for the attachment of weight components to the frame 101. These weight components may provide sufficient weight to the roller system 100 to ensure detonation, allowing the frame 100 to be constructed from lighter materials such as aluminum or carbon fiber, for example. Moreover, because different soil types and mine types may require more or less penetrative force to ensure detonation, the weight component attachment points may allow the weight of the roller system 100 to be adjusted based on observed operating conditions.

Moreover, the weight component attachment points 122a-122h may allow for a center of gravity associated with the roller system 100 to be adjusted. For example, by increasing the amount of weight components attached to the weight component attachment points 122a-122d the center of gravity of the roller system 100 may be biased towards the transverse member 105e. Similarly, by increasing the amount of weight components attached to the weight component attachment points 122a and 122e, the center of gravity of the roller system 100 may be biased towards the side member 107a.

By biasing the center of gravity of the roller system 100, the amount of force directed through the various arm assemblies 110 can be adjusted and controlled. For example, the center of gravity of the roller system 100 may be adjusted to provide more force to the arm assemblies 110a-110f, or through arm assemblies 110g-110l. Because each arm assembly 110 may be a different type of arm assembly 110 with different force or weight requirements and/or limitations, the amount of force put upon each arm assembly 110 by adjusting the center of gravity of the roller system 100 by strategic placement of the weight components.

Moreover, the weight component attachment points 122a-122h may allow for a center of gravity associated with the roller system 100 to be adjusted upwards or downwards. For example, by increasing the amount of weight components attached to the weight component attachment points 122a-122h the center of gravity of the roller system 100 may be biased upwards away from the ground. As illustrated, in some implementations, the transverse members 105a and 105e may be recessed slightly below the transverse members 105b and 105c. By recessing the transverse members 105a and 105e, the center of gravity of the frame 101 is effectively lowered, allowing for a greater amount of weight components to be applied to the transverse members 105a and 105e without substantially biasing the center of gravity of the frame 101 away from the ground.

Figure 3:
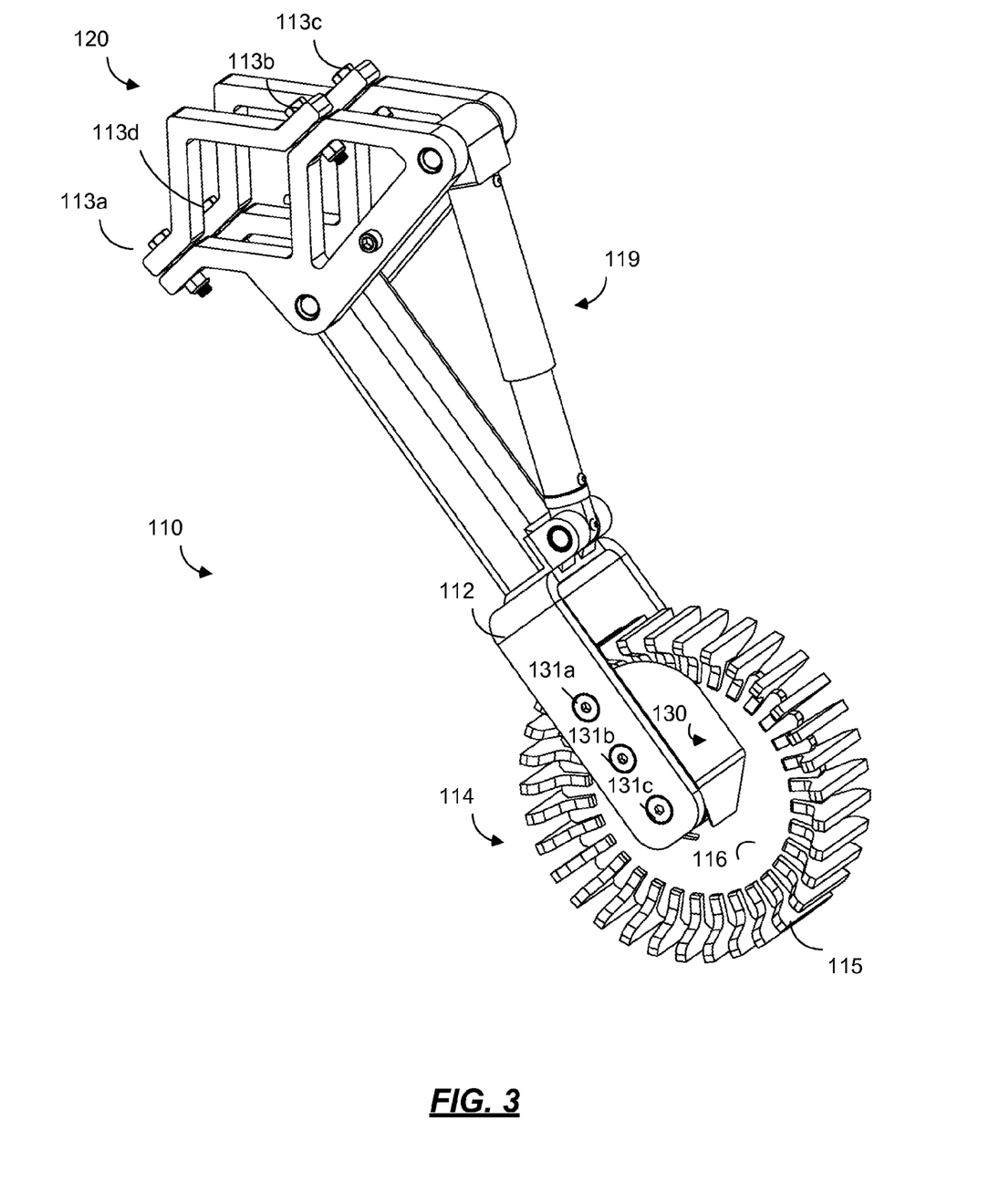
FIG. 3 is an illustration of a perspective view of an example arm assembly.

FIG. 3 is an illustration of an example arm assembly 110. The arm assembly may also be referred to as a "swing arm." As illustrated the arm assembly includes an arm mount 120. The arm mount 120 may be adapted to detachably connect the arm assembly to the frame 101 of the rolling system 100. As illustrated previously with respect to FIG. 2, the arm mount 120 may be detachably connected to one of transverse members 105b and 105c. For example, arm mounts 120h and 120i are detachably connected to transverse member 105b.

The arm mount 120 may be detachably connected to a transverse member such that an arm assembly 110 may be easily removed from, or added to, the frame 101. In some implementations, the arm mount 120 may be detachably connected using a collar clamp. As illustrated in FIG. 3, the arm mount 120 may be connected to a transverse member using bolts 113a-113d. However, more or fewer bolts may be used to connect the arm mount 120.

The detachably connected arm mount 120 is designed to be easily and quickly removed from the frame 101 for assembly, disassembly, and/or repair. Previous roller system designs often featured rollers (on arms or other means) that were either so integrated into the design of the roller frame that the roller frame would be inoperable if a roller or swing-arm became damaged, or were so integrated into other rollers of the roller frame that multiple rollers would become inoperable if a roller became damaged. Moreover, such arrangements make the assembly and disassembly of the roller system 100 difficult, as well as make swapping out arm assemblies 110 in the field difficult or impossible. By detachably connecting each arm mount 120 to the frame 100, if an arm assembly 110 becomes damaged, or a different arm assembly 110 is otherwise desired, it can be easily replaced or removed from the frame 100 at the location of the demining operation by an operator, and without the disassembly of any part of the frame or the removal of any other arm assembly 110. Thus, each arm assembly 110 is independent of the other arm assemblies 110 connected to the frame 101, and independently connected to the frame 101 such that the removal or addition of an arm assembly will not affect the operation of the other arm assemblies 110 or require the removal or addition of any arm assemblies 110. Moreover, the weight attachment points may further allow the operator to adjust the weight of the frame 100 to compensate for the weight of the removed arm assembly 110, or to adjust the center of gravity of the frame 100 to compensate for the weight of the removed arm assembly 110, for example.

The detachably connected arm mounts 120 may further allow the arm assemblies 110 to be arranged in variety of patterns and configuration on the frame 101. For example, as illustrated in FIG. 2, the arm assemblies 110a-110l are staggered across the transverse members 105c and 105b such that substantially all the ground beneath the frame 101 is in contact with at least one arm assembly 110 without substantial overlap between arm assemblies 110. Alternatively, the arm assemblies 110a-110l are arranged so that there is overlap between the ground traversed by the arm assemblies to provide redundancy. More or fewer arm assemblies 110 may be part of an arm assembly 110 arrangement. There is no limit to the number of arrangements for the arm assemblies 110-a-110l.

For example in one arrangement, the arm assemblies 110 may be arranged on the transverse members 105c and 105b such that the arm assemblies apply force to the ground in regions of the ground that will be in contact with the treads or wheels of a vehicle that is pushing the roller system 100. Such an arrangement will ensure that any mine that could potentially be triggered by the pushing vehicle will be detonated by an arm assembly 110, while minimizing the number of arm assemblies 110 that are used. Minimizing the number of arm assemblies may reduce any pushing friction caused by the contact between the arm assemblies 110 and the ground, as well as make more arm assemblies 110 available for other roller systems 100. Such an arrangement may be useful in situations where a lighter or higher speed pushing vehicle may be desirable (e.g., combat situations).

The arm assembly 110 may further include a strut 119. In some implementations, the strut 119 may include a spring or other pressure source to help keep the arm assembly in contact to the ground and to provide suspension. For example, a minefield may be uneven or have divots, craters, or other imperfections. The struts 119 on each arm assembly 110 may help keep each arm assembly 110 in contact with the ground regardless of the ground conditions, and provide suspension to the roller system 100. As illustrated, the strut 119 may be connected between the base of the fork 112 and the arm assembly 120 of an arm assembly 120. In some implementations, each strut 119 may provide suspension through a balanced or networked pressure distribution system (not shown) that helps each strut 119 produce a constant force or pressure to the ground. Such a networked or balanced pressure distribution system is illustrated in International Application number PCT/US2008/010890 which is herein incorporated by reference in its entirety. In other implementations, the strut 119 may include a mechanical spring or spring, or a gas or fluid based spring. Other types of springs or suspension systems may also be used for the strut 119, or in addition to the strut 119, for example.

The arm assembly 110 may further include a fork 112. The fork 112 may include a first and a second portion and may be adapted to receive and secure a ground connection means 114. As illustrated in FIG. 3, the ground connection means 114 may be a wheel, such as the wheel 114. Other ground connection means 114 may be used such as skis, for example.

In some implementations, the wheel 114 may include a plurality of paddle components 115 arranged in a disk 116. The paddle components 115 and disk 116 may be constructed of a variety of materials and material types. For example, the paddle components 115 and disk 116 may be constructed from plastic, rubber, metal, carbon fiber or any other materials.

In some implementations, the paddle components 115 may be substantially trapezoidal in shape with the width of the paddle component 115 generally increasing from where it connects to the disk 116 to an outer edge of the paddle component 115. Other shapes may also be used. For example, the paddle components 115 may be generally square or rectangular. In some implementations, each paddle 115 may be generally solid. In other implementations, each paddle 115 may have one or more holes or may be constructed from metal wire and/or tubing.

As illustrated, the paddle components 115 may be arranged into one or more teeth or slots of the disk 116. The amount of paddle components 115 used and the spacing between each of the paddle components 115 in the disk 116 may be determined by the type of soil or condition of the ground.

The use of paddles 115 in the wheel 114 may help prevent bow waves. As described previously in the background section, a bow wave is a buildup of dirt or other debris in front of the wheels or rollers of the roller system 100. The paddles 115 of the wheel 114 may help prevent the buildup of a bow wave because some amount of dirt and debris may be captured between the paddles 115 of the wheel 114 as the wheel 114 rotates. The captured dirt may then be deposited behind the wheel 114. This gradual capture and deposit of dirt that builds up in front of the wheel 114 by the paddles 115 may help prevent the formation of a bow wave. In some implementations, the size of the space between each of the paddles 115 may be selected based on the type or condition of the soil. For example, for a fine soil, a smaller space between the paddles 115 may be suitable, while for a clumpy soil, a larger space between the paddles 115 may be required so that the larger clumps of soil may be able to fit between the paddles 115. The spacing between each paddle 115 may be approximately 3.5 inches. However, in other implementations, the spacing may range from approximately one quarter of an inch to approximately five inches.

In addition to the paddles 115, a variety of wheels and wheel types may be used for the wheel 114. For example, depending on the ground conditions, conventional tires may be used for the wheel 114 rather than the paddles 115. As described above, because the arm mount 120 is detachably connected to the frame 101, a variety of arm assemblies with different ground connection means 114 may be used on the roller system 110. Operators of the roller system 101 may determine the appropriate ground connection means 114 to use for a particular soil type or terrain, and may accordingly attach the appropriate arm assemblies 110 to the frame 101. In addition, the operator may determine an appropriate spacing or amount of arm assemblies to attach to the frame 101. The arm assemblies 110 attached to a frame 101 may be of the same type, or a variety of types of arm assemblies 110 may be used at once. For example, an operator may attach a set of arm assemblies 110 that include the paddle components 115 and a set of arm assemblies 110 that include conventional rubber tires, be they pneumatic or solid rubber, phonolic resin, or other suitable materials.

Figure 4:
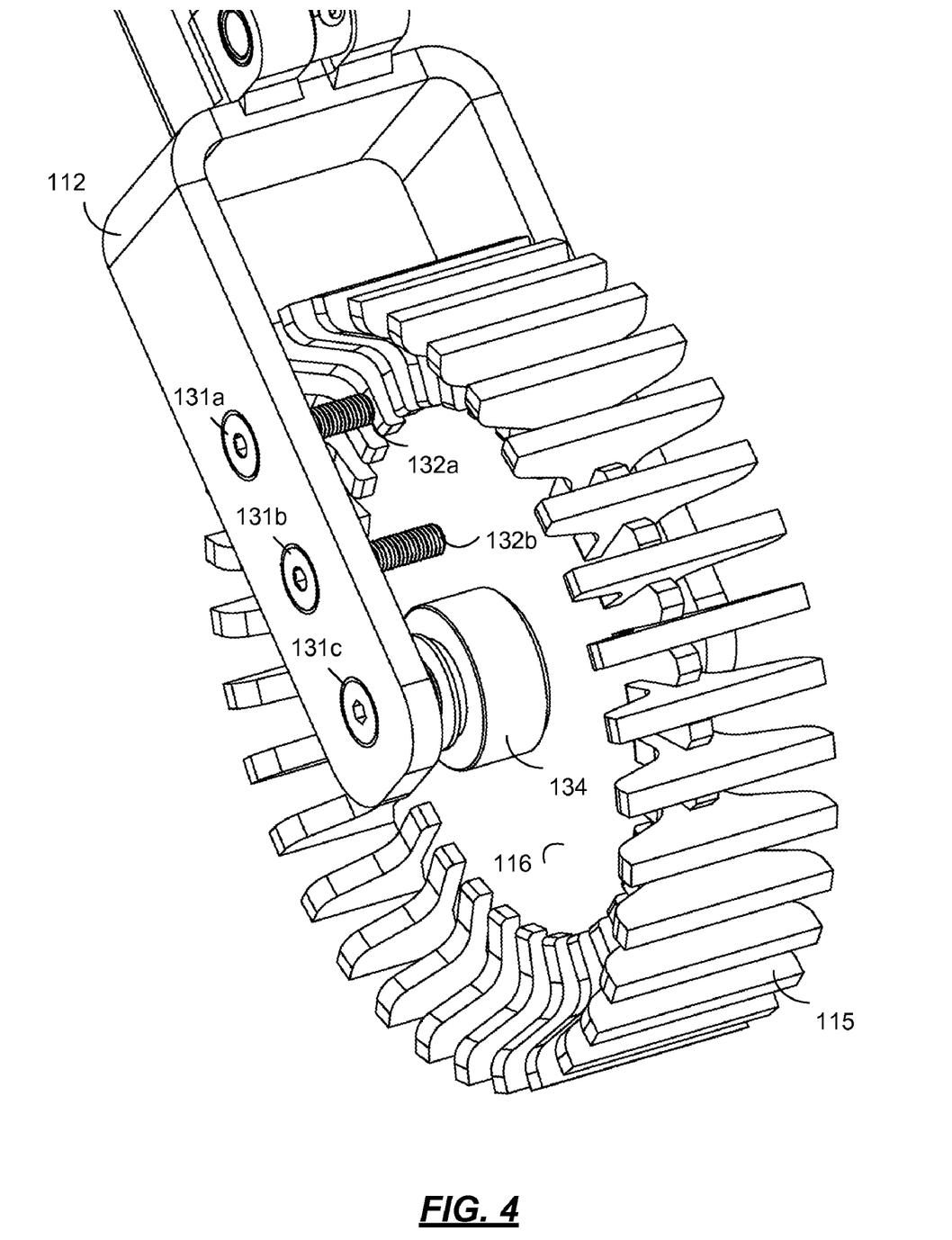
FIG. 4 is an illustration of a perspective view of an example wheel.

FIG. 4 is an illustration of a wheel 114. The wheel 114 may further include a hub assembly 134 that connects to the disk 116 and secures the wheel 114 within the fork 112, as well as provides for the rotation of the wheel 114 with respect to the fork 112. The hub assembly 134 may be secured to the fork 112 by a fastener 131c. In some implementations, the fastener 131c may be a bolt. Other fasteners may also be used.

In some implementations, the wheel 114 may further include bolts 131a and 131b. As illustrated the bolts 131a and 131b pass through the fork 112 and extend into a space or cavity formed between the paddles 115 of the wheel 114 and the hub assembly 134. The bolts 131a and 131b may form what is referred to herein as the debris removal component. As the roller system 100 moves, debris such as mud may become lodged or stuck into the space between the paddles 115 and the hub assembly 134. The debris removal component may prevent such accumulation of debris in the space between the paddles 115 and the hub assembly 134 because as the wheel 114 rotates about the hub assembly 134, any debris that has accumulated in the space will be dislodged by the bolts 131b and 131a as they pass through it.

In some implementations, the bolts 131a and 131b are selected to be long enough to sufficiently clear debris from the space between the paddles 115 and the hub assembly 134 without interfering with the movement of the wheel 114. For example, the bolts 131a and 131b may be 12 mm long. However, other lengths may also be used. In addition, the bolts 131a and 131b are not limited to bolts, any type of structure that extends into the space between the paddles 115 and the hub assembly 134 may be used. Also, more or fewer bolts 131 may be used for the debris removal component. Moreover, a second debris removal component may be similarly attached to the fork 112 on the side of the fork 112 that is obscured by the wheel 114.

Figure 5:
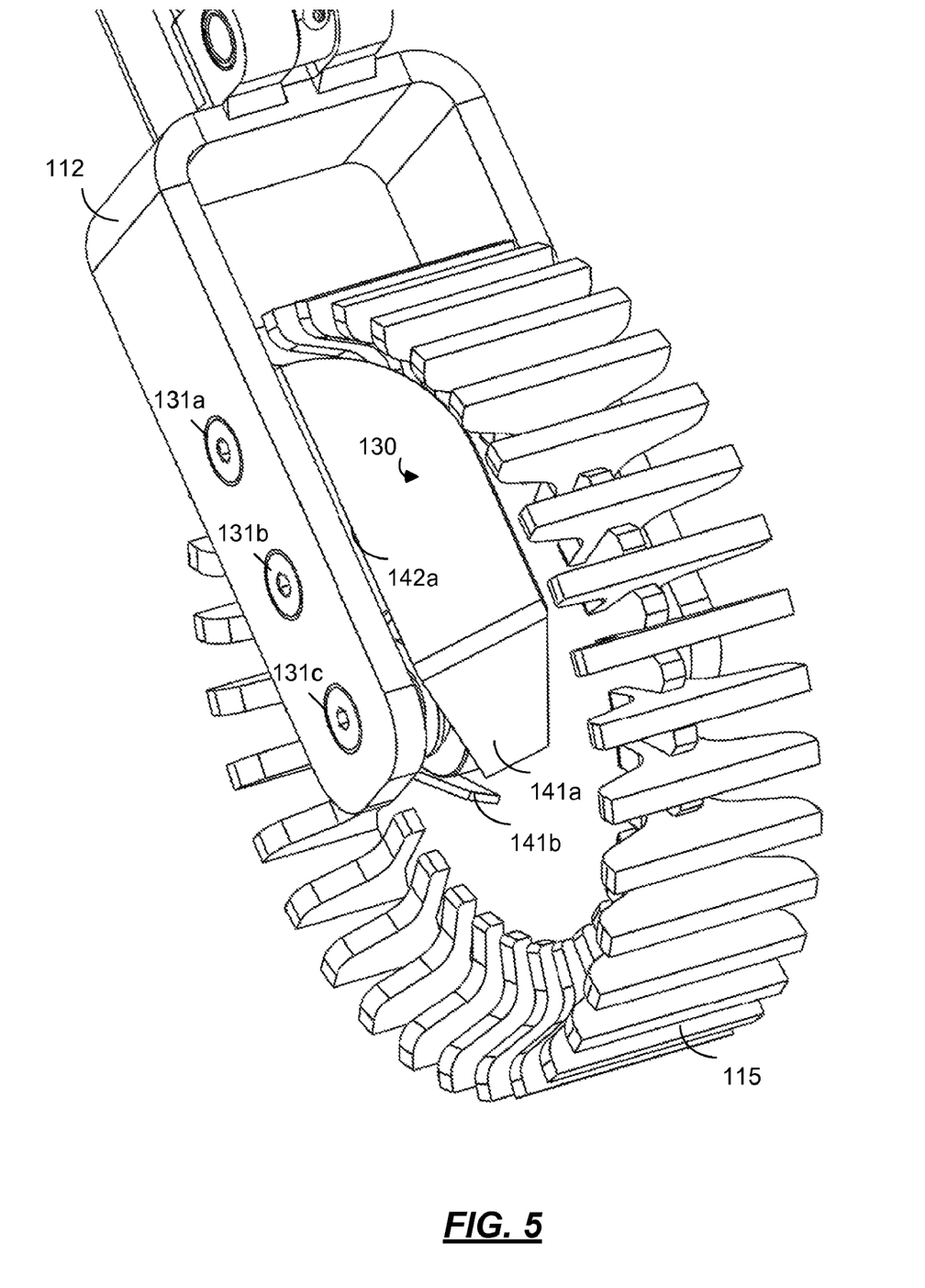
FIG. 5 is an illustration of a perspective view of an example wheel.
Figure 6:
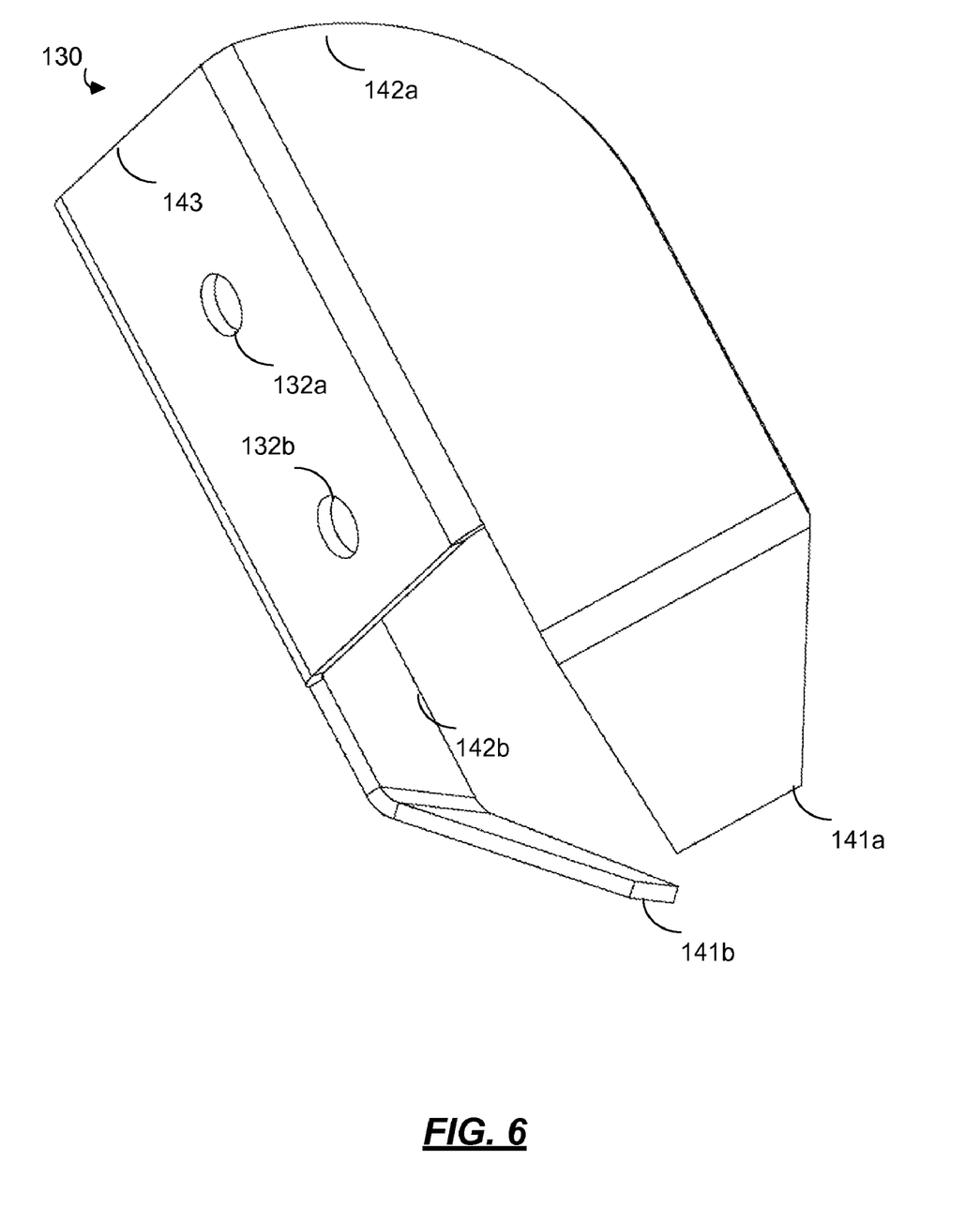
FIG. 6 is an illustration of a perspective view of an example debris removal component.

FIG. 5 is an illustration of a wheel 114 including a debris removal component 130, and FIG. 6 is an illustration of an example debris removal component shown off of the wheel 114 such that its features may be more easily observed. The debris removal component 130 is an alternative implementation of the debris removal component illustrated in FIG. 4 using the bolts 132a and 132b.

As illustrated, the debris removal component 130 includes a mounting plate 143. The mounting plate 143 may connect the debris removal component 130 to the fork 112. In some implementation, the mounting plate 143 may include a plurality of mounting holes 132a and 132b. The mounting holes 132a and 132b may be sized to receive bolts 131 and 131b respectively, and secure the mounting plate 143 within the fork 112. The mounting plate 143 may be substantially rectangular and may be sized approximate to the size of the fork 112. However, other shapes and sizes may be used. The mounting plate 143 may be constructed from a variety of materials including metal and various metal alloys, plastic, and carbon fiber, for example.

The debris removal component 130 may further include side portions 142a and 142b. The side portions 142a and 142b may be generally rectangular in shape with each having a curved end portion. The curved end portion may be shaped to fit in the space between the paddles 115 and the fork 112 when the debris removal component 130 is mounted to the fork 112. By including the curved end portion in the side portions 142a and 142b, the amount of debris that may be removed from the space between the paddles 115 and the hub assembly 134 is maximized. The side portions 142a and 142b may be made from the same or different material as the mounting plate 143.

The debris removal component 130 may further include end portions 141a and 141b connected to side portions 142a and 142b respectively. In some implementations, the end portions 141a and 141b may be generally tapered and bend inwards around the hub assembly 134 when the debris removal component 130 is mounted to the fork 112. The end portions 141a and 141b may protect the hub assembly 134 from debris. The end portions 141a and 141b may be made from the same of different material as the side portions 142a and 142b of which they are attached.

When the wheel 114 illustrated in FIG. 5 is moved counter clockwise, any debris in the space between the hub assembly 134 and the paddles 115 will be deposited against and trapped by the side portion 142a of the debris removal component 130. The collected debris may slide down the side portion 142a and over the end portion 141a where it may then fall out of the wheel 114. Similarly, when the wheel 114 is moved clockwise, any debris in the space between the hub assembly 134 and the paddles 115 will be deposited against and trapped by the side portion 142b. The collected debris may slide down the side portion 142b and over the end portion 141b where it may then fall out of the wheel 114.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A roller system for detonating pressure triggered explosive devices comprising:
    a modular frame comprising:

two parallel side members;

a plurality of transverse members connected to each side member;

a plurality of arm assemblies, wherein each arm assembly comprises a single wheel, each arm assembly is independent of the other arm assemblies, and each arm assembly is independently connected to one of the plurality of transverse members; and a plurality of weight component attachment points connected to one of the plurality of transverse members, wherein each weight component attachment point is adapted to receive a plurality of weight components such that an amount of penetrative force that that is directed through each at least one arm assembly may be adjusted to detonate a pressure triggered explosive device located underneath the ground.

2. The roller system of claim 1, wherein each at least one arm assembly is configured to detachably connect to a transverse member of the plurality of transverse members independently of other at least one arm assemblies and without the disassembly of the frame.

3. The roller system of claim 1, wherein each at least one arm assembly comprises an arm mount for detachably connecting to a transverse member.

4. The roller system of claim 3, wherein the arm mount is a collar clamp.

5. The roller system of claim 3, wherein the arm mount is detachably connected to the transverse member using at most four bolts.

6. The roller system of claim 1, wherein each arm assembly further comprises:

a fork;

a hub assembly; and a debris removal component a connected to the fork and adapted to remove debris between the wheel and the hub assembly as the wheel is rotated about the hub assembly and through the fork.

7. The roller system of claim 6, wherein the wheel further comprises a plurality of paddle components connected to the hub assembly.

8. The roller system of claim 7, wherein the paddle components are spaced on the hub assembly to prevent the formation of a bow wave.

9. The roller system of claim 6, wherein the debris removal component extends from the fork into a space formed between the wheel and the hub assembly.

10. The roller system of claim 9, wherein the debris removal component is a bolt.

11. The roller system of claim 9, wherein the debris removal component is a plurality of bolts.

12. The roller system of claim 9, wherein the debris removal component comprises:

a mounting plate adapted to mount to the fork;

a first side portion connected to the mounting plate and extending into the space between the hub assembly and the wheel;

a second side portion connected to the mounting plate and extending into the space between the hub assembly and the wheel;

a first end portion connected to the first side portion and covering a portion of the hub assembly; and a second end portion connected to the first side portion and covering a portion of the hub assembly.

13. The roller system of claim 1, wherein the frame further includes a hitch portion that is adapted to be pushed by a pushing vehicle.

14. The roller system of claim 1, wherein the two parallel side portions and the plurality of transverse members are connected using disengaging fasteners that are adapted to disengage in the event of a detonation of a pressure triggered explosive device.

15. The roller system of claim 1, wherein each weight attachment point is a bin and each of the weight components are materials that are available at a demining operation site.

* * * * *